US007206962B2

(12) United States Patent
Deegan et al.

(10) Patent No.: US 7,206,962 B2
(45) Date of Patent: Apr. 17, 2007

(54) HIGH RELIABILITY MEMORY SUBSYSTEM USING DATA ERROR CORRECTING CODE SYMBOL SLICED COMMAND REPOWERING

(75) Inventors: John M. Deegan, Hopewell Junction, NY (US); Kevin Charles Gower, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 10/723,055

(22) Filed: Nov. 25, 2003

(65) Prior Publication Data

US 2005/0114750 A1 May 26, 2005

(51) Int. Cl.
G06F 11/10 (2006.01)
G11C 29/00 (2006.01)

(52) U.S. Cl. .......................... 714/6; 714/763; 714/767; 714/772

(58) Field of Classification Search ................ 714/763, 714/767, 768, 772, 773, 6
See application file for complete search history.

(56) References Cited

U.S. PATENT DOCUMENTS

| 4,810,505 | A |   | 3/1989  | Pachernegg ............... 426/16 |
|-----------|---|---|---------|----------------------------------|
| 4,888,773 | A | * | 12/1989 | Arlington et al. ........... 714/764 |
| 4,910,505 | A |   | 3/1990  | Beaven et al. ............... 340/750 |
| 5,164,944 | A | * | 11/1992 | Benton et al. ............... 714/765 |
| 5,173,905 | A | * | 12/1992 | Parkinson et al. .......... 714/768 |
| 5,384,567 | A |   | 1/1995  | Hassner et al. ............... 341/51 |
| 5,761,221 | A | * | 6/1998  | Baat et al. .................. 714/767 |
| 5,978,953 | A | * | 11/1999 | Olarig ........................ 714/768 |
| 6,260,127 | B1 | * | 7/2001 | Olarig et al. ............... 711/167 |
| 6,691,276 | B2 | * | 2/2004 | Holman ..................... 714/767 |
| 6,826,113 | B2 | * | 11/2004 | Ellis et al. .................. 365/233 |
| 6,981,095 | B1 | * | 12/2005 | MacLaren et al. ......... 711/115 |
| 7,051,166 | B2 | * | 5/2006 | Sharma ...................... 711/150 |
| 2004/0205433 | A1 | * | 10/2004 | Gower et al. ............... 714/733 |

OTHER PUBLICATIONS

IBM Technical Disclosure Bulletin: "Bus ECC for High Availability and Recovery in Real Time"; Inventors: R.A. Christiansen and A.R. Treu. vol. 32 No. 5B Oct. 1989; BC887-0307 RLI pp. 235-236; 89A062311.

* cited by examiner

Primary Examiner—Stephen M. Baker
(74) Attorney, Agent, or Firm—Cantor Colburn LLP

(57) ABSTRACT

A memory subsystem comprising: a command register in operable communication with a plurality of memory devices via a plurality of command buses. The plurality of memory devices is arranged into symbol slices and each symbol slice is configured to be part of a single error correction code packet. Each command bus of the plurality of command buses is configured to interface between the command register and each memory device in a particular symbol slice. A method of command bus redundancy comprising: configuring a plurality of memory devices into symbol slices, each symbol slice configured to be part of a single error correction code packet; establishing a plurality of command buses, each command bus configured to interface with each memory device in a particular symbol slice; and configuring a command register with sufficient command bus drivers to support each command bus of the plurality of command buses.

11 Claims, 3 Drawing Sheets

HIGH RELIABILITY MEMORY SUBSYSTEM USING DATA ERROR CORRECTING CODE SYMBOL SLICED COMMAND REPOWERING

BACKGROUND OF THE INVENTION

This invention is related to autonomic computing architectures using high reliability memory subsystems. Autonomic computing architectures using high reliability memory subsystems often employ redundant memory devices and an error correcting code, (ECC) to correct errors that occur during operation. The ECC can be structured with a multi-bit symbol to correct errors that result from an inoperative memory device. This is often referred to as 'chip kill ECC'. A very high percentage of memory subsystem circuitry is typically covered through this means of error correction. Memory subsystems that utilize another high reliability feature called 'sparing' or 'redundant bit steering' are able to disable selected memory devices and replace them with dedicated spare devices allowing the memory subsystem to be repaired, or healed. Usually, the data path interconnections between the memory subsystem devices and ECC logic are also protected by this same mechanism.

Even with the above-mentioned high reliability features, inoperative circuits and interconnections that can result in uncorrectable errors still exist in memory subsystems. The majority of the remaining interconnection errors are typically found in the command and address signals within the memory subsystem. Because they are interconnected to multiple memory devices, a single inoperative circuit on a command or address bus, can result in multi-data bit errors.

Other high reliability memory subsystem architectures such as memory mirroring or raid-like redundant subsystem architectures use many additional memory devices to achieve higher reliability. This can add significantly to the cost of memory subsystems.

Therefore, what is needed in the art is a low cost solution that provides memory subsystem command and address bus redundancy between the dual inline memory module (DIMM) register and dynamic random access memory (DRAM) devices without adding additional redundant memory devices, to efficiently enable autonomic computing through additional self healing capabilities at reasonable prices.

BRIEF SUMMARY OF AN EXEMPLARY EMBODIMENT

Disclosed herein in an exemplary embodiment is a memory subsystem with symbol sliced command repowering comprising: a command register in operable communication with a plurality of memory devices via a plurality of command buses. The plurality of memory devices are arranged into symbol slices and each symbol slice is configured to be part of a single error correction code packet. Each command bus of the plurality of command buses is configured to interface between the command register and each memory device in a particular symbol slice.

Also disclosed herein in yet another exemplary embodiment is a method of command bus redundancy in a memory subsystem comprising: configuring a plurality of memory devices into symbol slices, each symbol slice configured to be part of a single error correction code packet; establishing a plurality of command buses, each command bus configured to interface with each memory device in a particular symbol slice; and configuring a command register with sufficient command bus drivers to support each command bus of the plurality of command buses.

Finally, disclosed herein in another exemplary embodiment is a system for command bus redundancy in a memory subsystem including a memory device array configured into symbol slices, each symbol slice configured to be part of a single error correction code packet; a plurality of command registers each including a plurality of command buses associated therewith, each command bus configured to interface with each memory device included within a particular symbol slice; and a memory controller, the memory controller in operable communication with the plurality of command registers including a command bus employing an error correction code.

BRIEF DESCRIPTION OF THE DRAWINGS

These and other objects and advantages of the present invention may be best understood by reading the accompanying detailed description of the exemplary embodiments while referring to the accompanying figures wherein like elements are numbered alike in the several figures in which.

The detailed description explains the preferred embodiments of our invention, together with advantages and features, by way of example with reference to the drawings.

DETAILED DESCRIPTION OF THE EXEMPLARY EMBODIMENTS

Figure 1:
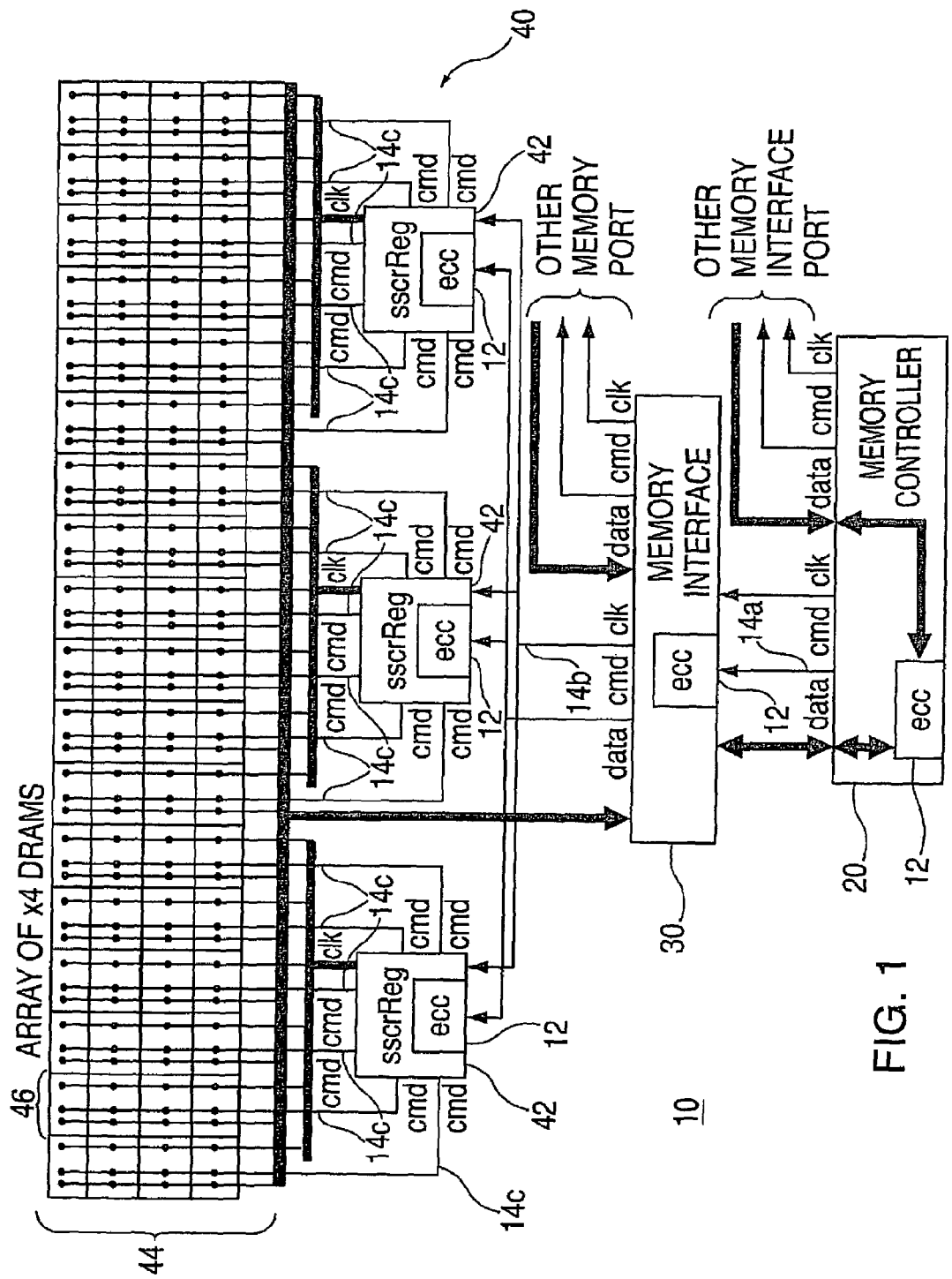
FIG. 1 is a simplified block diagram depicting a memory module with Error Correction Code Symbol Sliced Command Repowering in accordance with an exemplary embodiment.

Referring to FIG. 1, a simplified block diagram of a memory subsystem 10 is depicted. In an exemplary embodiment, a memory controller 20 is interfaced via command and address bus 14, data buses and various controls and the like to a memory interface chip 30, and a dual inline memory module (DIMM) 40. The DIMM 40 may include but not be limited to a register(s) 42 interfaced to an array of memory devices 44. In an exemplary embodiment, an error correcting code ECC 12 is employed on the command and address connections 14, denoted 14a and 14b between a memory controller 20, a memory interface chip 30, and a DIMM register(s) 42 to facilitate increased robustness and redundancy for the command and address bus 14. Furthermore, it will be appreciated that industry standard DIMMs shown generally as 40 include memory devices 44 e.g., dynamic random access memory DRAM or otherwise, do not currently support ECC on the command and address signals 14c. Therefore, an alternative embodiment is employed that addresses enhancement of the paths from the DIMM register 42 to the memory devices 44. It will be appreciated that while in an exemplary embodiment the memory subsystem 10 described as including a memory interface chip 30 and a memory controller 20 interfaced to the register 42 of the DIMM 40, the configuration of the memory subsystem 10 may readily be varied. For example, in one embodiment, the memory interface chip 30 may not be employed. It will also be appreciated that the exact implementation of a memory subsystem may include or not include various elements. The exemplary embodiments described here may readily be applied to these systems as well without deviating from the scope of the claims or disclosure herein.

Figure 3:
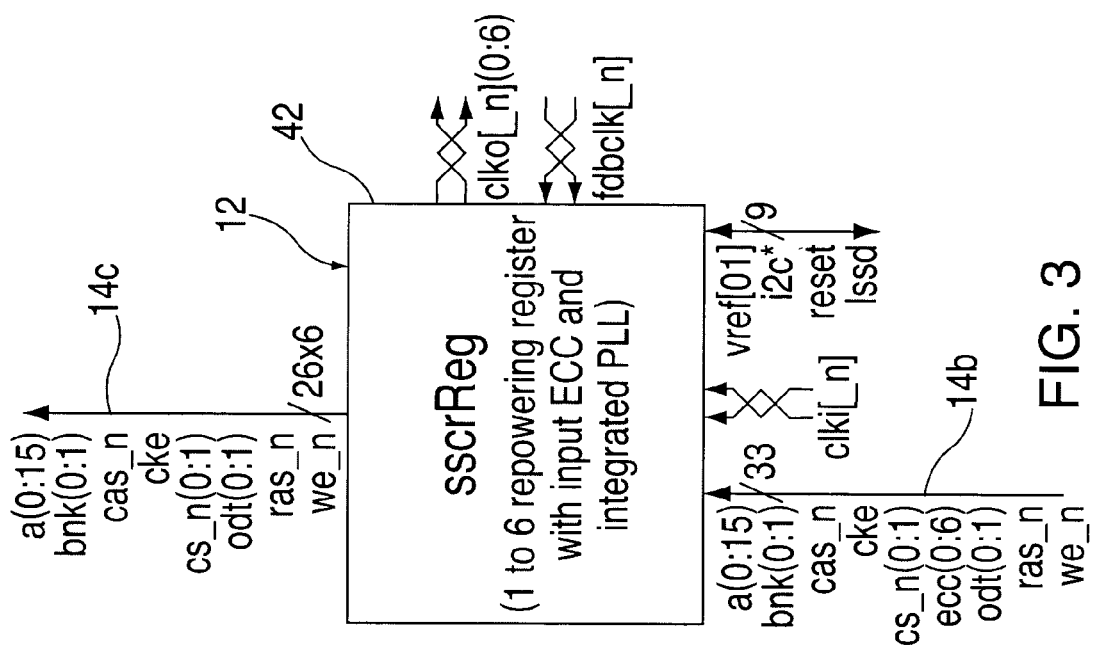
FIG. 3 is a simplified block diagram depicting an illustrative command register in accordance with an exemplary embodiment.
Figure 2:
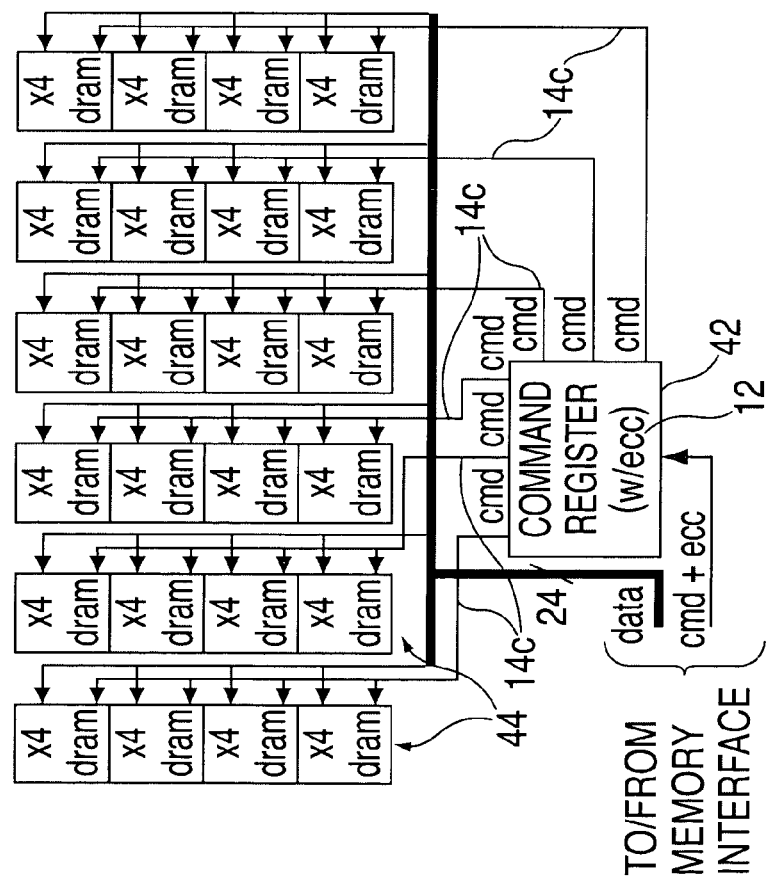
FIG. 2 depicts a simplified partial view of a command register and memory devices employing repowered command and address busses in accordance with an exemplary embodiment.

Turning now to FIGS. 2 and 3 as well, in another exemplary embodiment, additional, redundant copies (also denoted as repowered) of the command and address bus 14c from the DIMM registers 42 to selected memory devices 44 are employed as depicted in the figure. FIG. 2 depicts a simplified partial view of a command register 42 and memory devices 44 employing repowered command and address busses 14c. The repowered command and address busses 14c are connected to the same memory devices 44 that correspond to the data bits within a selected ECC symbol. Advantageously, with the configuration of an exemplary embodiment, in the memory address and command repowering 14c from the DIMM registers 42 to the DRAM memory devices 44 results in data error robustness that is completely correctable by existing system ECC 12. Furthermore, the data ECC Symbol Sliced Command Repowering, (SSCR) technique of an exemplary embodiment, provides redundancy for the majority of remaining memory subsystem connections not otherwise covered with error correction, requires no additional memory devices and works with the existing ECC 12 and redundant bit steering. Therefore, the exemplary embodiments described herein are much less expensive to implement than existing memory subsystems with memory mirroring or other architectures that add additional memory devices to address fault tolerance. Further, this technique can be used in conjunction with designs that implement command and address ECC 12 between memory controller 20 to memory interface 30 and memory interface 30 to DIMM Register 42. SSCR provides redundancy for circuits between the DIMM Register 42 and DRAM devices 44 where command and address bus ECC cannot be used.

Referring now to FIG. 3 as well, a simplified block diagram of a single command register 42 is depicted. In an exemplary embodiment, SSCR operates by adding additional outputs to the DIMMs command register 42 and corresponding redundant command and address buses 14c. The new outputs are redundant copies that are driven separately to the memory devices 44. In an exemplary embodiment, the copies of the command and address bus 14c are driven to selected memory devices 44 whose data signals are all contained within the same ECC symbol.

Advantageously, this approach constrains the number of redundant outputs of the register 42 and command and address bus 14c lines required, and ensures that any potentially affected data bits are constrained to within the particular ECC symbol. Advantageously, errors within a given ECC symbol are fully correctable by an existing system data ECC. In an exemplary embodiment, memory devices 44 stacked within a given column (as depicted in FIG. 2) are connected together such that they are contained within the same ECC symbol. This is accomplished by ensuring that redundant copies of the command and address bus 14c from the command register 42 correspond to a single data bit ECC symbol. In other words, the memory devices 44 are organized with redundant command and address buses 14c such that each grouping of memory devices is part of a correctable piece of a data word for the given memory subsystem configuration.

In an exemplary embodiment, SSCR may be implemented by designing a command register 42 and a memory packaging arrangement with enough command and address bus 14c copies such that independent instances can be connected to groups of memory devices that are all contained within the same system data ECC symbol. FIG. 2 depicts a simplified block diagram of a possible implementation of an SSCR enabling command register and memory subsystem 10 arrangement.

Figure 4:
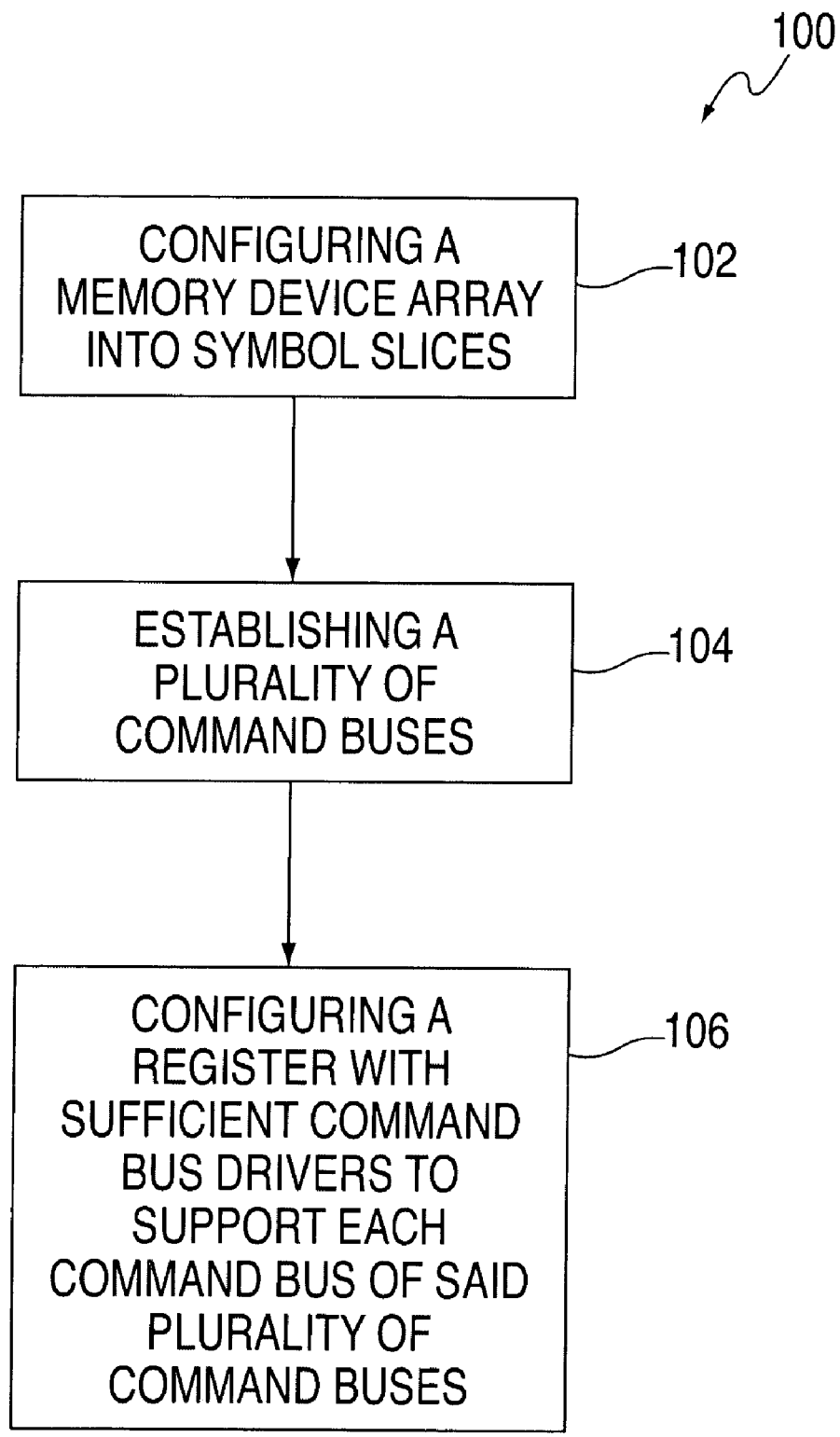
FIG. 4 is a simplified block diagram depicting the repowering methodology in accordance with an exemplary embodiment.

Turning now to FIG. 4, a simplified block diagram depicting the methodology 100 of an exemplary embodiment is depicted. Continuing with process block 102, an array of memory devices 44 are arranged into symbol slices 46 (shown in FIG. 2) such that each memory device in the symbol slice is an element of a single error correction code packet. At process block 104, a plurality of command busses 14c is established, where each command bus 14c is configured to drive each memory device 44 of a particular symbol slice as arranged above. Finally, one or more memory register(s) 42 is configured to include sufficient drivers for each command bus 14c established as depicted at process block 106.

It will be appreciated that the use of first and second or other similar nomenclature for denoting similar items is not intended to specify or imply any particular order unless otherwise stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A memory subsystem with symbol sliced command repowering comprising:
   a command register in operable communication with a plurality of memory devices via a plurality of command buses;
   wherein said plurality of memory devices is arranged into symbol slices and each symbol slice is configured to be part of a single error correction code packet; and
   a memory controller, said memory controller in operable communication with said command register including a command bus employing an error correction code;
   wherein each command bus of said plurality of command buses is configured to interface between said command register and each memory device in a particular symbol slice.

2. The memory subsystem of claim 1 further including a memory interface device in operable communication with said plurality of memory devices and said memory controller, with at least one of a command bus between said memory controller and said memory interface and a command bus between said memory interface and said command register including a command bus employing an error correction code.

3. The memory subsystem of claim 1 wherein said plurality of memory devices and said command register comprise a dual in line memory module.

4. The memory subsystem of claim 1 further including a memory interface device in operable communication with said plurality of memory devices and said memory controller, with at least one of a command bus between said memory controller and said memory interface and a command bus between said memory interface and said command register including a command bus employing another error correction code.

5. The memory subsystem of claim 4 wherein said plurality of memory devices and said command register comprise a dual in line memory module.

6. A method of implementing command bus redundancy in a memory subsystem comprising:
   configuring a plurality of memory devices into symbol slices, each symbol slice configured to be part of a single error correction code packet;
   configuring a plurality of command buses, each command bus configured to interface with each memory device in a particular symbol slice; and
   configuring a memory controller in operable communication with said command register including a command bus employing an error correction code.

7. The method of claim 6 further including configuring a memory interface device in communication with said plurality of memory devices and said memory controller, with at least one of a command bus between said memory controller and said memory interface and a command bus between said memory interface and said register including a command bus employing an error correction code.

8. The method of claim 6 wherein said plurality of memory devices and said command register comprise a dual in line memory module.

9. The method of claim 6 further including:
   configuring a command register in communication with a plurality of memory devices;
   configuring said memory controller with said command register, including a command bus employing another error correction code.

10. The method of claim 9 further including configuring a memory interface device in communication with said plurality of memory devices and said memory controller, with at least one of a command bus between said memory controller and said memory interface and a command bus between said memory interface and said register including a command bus employing said error correction code.

11. A system for command bus redundancy in a memory subsystem comprising:
    a memory device array configured into symbol slices, each symbol slice configured to be part of a single error correction code packet;
    a plurality of command registers each including a plurality of command buses associated therewith, each command bus configured to interface with each memory device included within a particular symbol slice; and
    a memory controller, said memory controller in operable communication with said plurality of command registers including a command bus employing an error correction code.

* * * * *